(12) United States Patent
Brown et al.

(10) Patent No.: US 8,279,441 B2
(45) Date of Patent: Oct. 2, 2012

(54) SPECTROPHOTOMETER AND METHOD

(75) Inventors: Chris Brown, Gilbert, AZ (US); Brian T. Pridham, Valparaiso, FL (US); John Peter Coates, Newtown, CT (US)

(73) Assignee: Mutoh Industries Ltd., Tokyo (JP)

( * ) Notice: Subject to any disclaimer, the term of this patent is extended or adjusted under 35 U.S.C. 154(b) by 127 days.

(21) Appl. No.: 12/594,249

(22) PCT Filed: Apr. 3, 2008

(86) PCT No.: PCT/US2008/059315
§ 371 (c)(1),
(2), (4) Date: Dec. 23, 2009

(87) PCT Pub. No.: WO2008/124542
PCT Pub. Date: Oct. 16, 2008

(65) Prior Publication Data
US 2010/0148083 A1 Jun. 17, 2010

Related U.S. Application Data

(60) Provisional application No. 60/921,632, filed on Apr. 3, 2007.

(51) Int. Cl.
*G01N 21/25* (2006.01)
(52) U.S. Cl. .................................... 356/407; 356/402

(58) Field of Classification Search .................. 356/407, 356/323, 319, 217, 317, 417, 326, 419, 402, 356/320, 420, 416; 250/343–345, 458.1, 250/459.1, 216
See application file for complete search history.

(56) References Cited

U.S. PATENT DOCUMENTS

| | | | |
|---|---|---|---|
| 4,857,735 A | 8/1989 | Noller | |
| 5,194,916 A | 3/1993 | Hayashi | |
| 6,844,931 B2 | 1/2005 | Ehbets | |
| 6,975,949 B2 | 12/2005 | Mestha et al. | |
| 2006/0050264 A1 | 3/2006 | Jung et al. | |
| 2006/0132777 A1 | 6/2006 | Hubble, III et al. | |
| 2007/0053200 A1 | 3/2007 | Brukilacchio | |
| 2010/0195103 A1* | 8/2010 | Styles et al. | 356/402 |

FOREIGN PATENT DOCUMENTS

| | | |
|---|---|---|
| EP | 1278049 A1 | 1/2003 |
| WO | WO 2005/015646 A1 | 2/2005 |

* cited by examiner

*Primary Examiner* — Tri T Ton
(74) *Attorney, Agent, or Firm* — Cahill Glazer PLC

(57) ABSTRACT

A spectrophotometer includes a plurality of LEDs arranged in a circular array, each having a calibrated power input determined by the use of pulse width modulation and each having a unique wavelength band determined by the utilization of a unique fluorescent phosphor coating or lens. At least one of the LEDs comprising a phosphor-free high energy UV LED. Light reflected to the spectrophotometer is divided into predetermined wavelength ranges through the utilization of a linear variable filter and photo detectors wherein the analog signal from a photo detector is converted to a digital value through the use of auto-ranging gain technique.

1 Claim, 7 Drawing Sheets

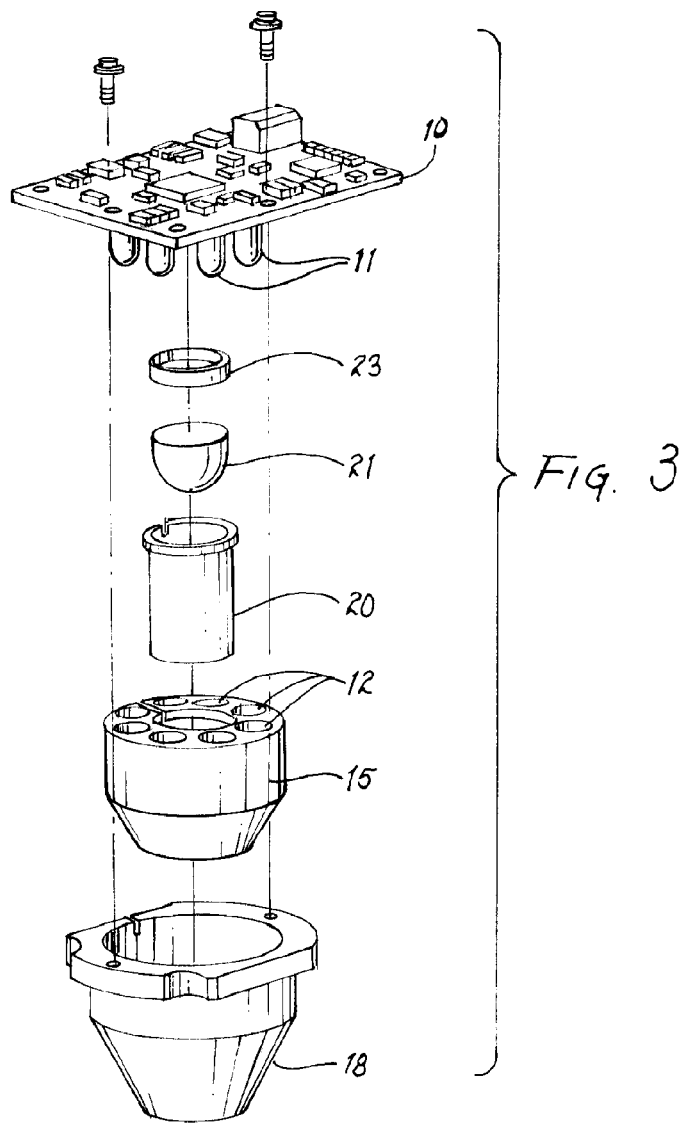
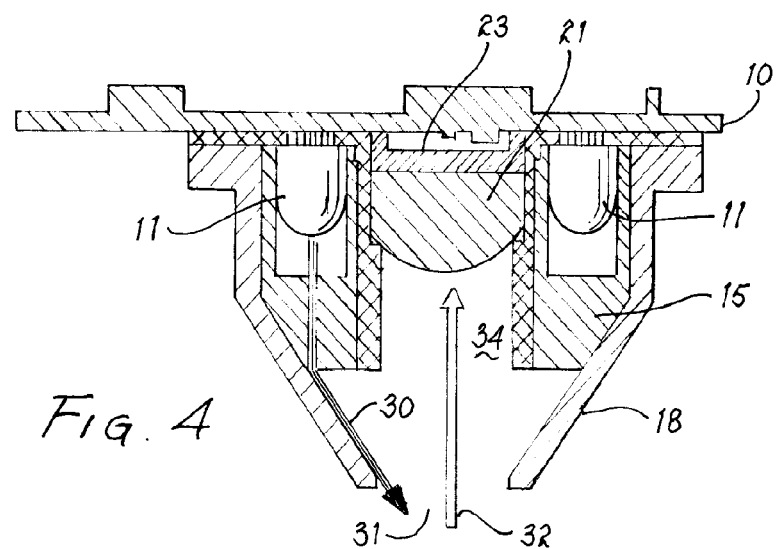

SPECTROPHOTOMETER AND METHOD

CROSS-REFERENCE TO RELATED APPLICATION

This application is related to and claims priority to a provisional application entitled "COLOR SPECTROPHOTOMETER" filed Apr. 3, 2007 and assigned Ser. No. 60/921,632.

FIELD OF THE INVENTION

The present invention relates to a measurement of color and particularly the spectrophotometric detection and evaluation of color through conversion of light wavelengths to corresponding digital data representation.

BACKGROUND OF THE INVENTION

Spectrally broadband instruments like densitometers and most colorimeters serve a variety of useful applications, though their usefulness is limited to a dedicated output or small sets of outputs. When only a measurement of RGB density is required, a densitometer will provide a direct and expedient result without the need for any form of intermediate data. Likewise, if the CIELab values of a sample or group of samples is all that is needed, or perhaps the XYZ tristimulus values of those samples, an inexpensive colorimeter can provide those results. These devices make use of the net spectral content of the colors being measured and inherently reduce the information to only a few values, usually three. When those three values are all that is needed, these devices have served their purpose.

By comparison, spectrometric devices (e.g. spectrophotometers and spectroradiometers) deliver data at the opposite extreme. Instead of providing a specific final result in only one metric, they provide the most fundamental measurement of a sample's color—it's spectral content. The spectral information, once collected and recorded, can be used to calculate virtually all other metrics used to quantify colors, including analytical density and colorimetric units such as XYZ, CIE-Luv, and others. It should be noted, however, that other data may be required along with the spectral measurements such as data pertaining to the colorants in order to perform the necessary calculations. Beyond the versatility advantages to collecting spectral data, there is the added advantage of having the ability to characterize spectral phenomena such as metamerism and fluorescence.

Conventional spectrophotometers employ a light source, a detector, and a device that is used to disperse or diffract light reflected from or transmitted through a sample, thereby allowing the spectral components to be detected and quantified. Commonly used components include prisms and diffraction gratings. Instruments that disperse the light source into it's spectral components, and then measure the amount of that light that is reflected from or transmitted through a sample, are known as monochromators.

Prisms are usually made from transparent materials such as glass or plastic, and disperse light into its spectral components. The material from which the prism is made has a refractive index that is different from that of air. When light passes from one material into another, it is refracted, that is to say its direction is changed by an amount that is dependent upon the difference between the refractive indices of the two materials. Further, the angle of refraction varies with wavelength so the spectral components that comprise the light are dispersed in space. A single sensor can be translated across this spatial dispersion to measure the amounts of each spectral component, or a stationary linear sensor can be positioned to measure the spectral components all at once.

Like prisms, diffraction gratings also disperse light into its spectral components, although the mechanism is very different. A diffraction grating is a reflecting or transmitting element that consists of a series of fine, parallel, equally spaced slits or rulings (grooves) on a material surface. When light passes through such an element, a pattern is produced by Fraunhofer diffraction. The advantage of gratings over prisms is the high resolving power they afford.

When light consisting of a single wavelength, i.e. monochromatic light, is passed through a diffraction grating, analysis of the resulting diffraction pattern can be used along with knowledge of the spacing between the rulings to determine the wavelength of the light. If the light consisted of two different wavelengths, then two patterns would be formed and the two separate wavelengths could subsequently be determined. If white light was passed through the diffraction grating, each wavelength would be sent in a different direction, as defined by the grating equation, and the pattern would appear as a spectrum. The amount of energy at each wavelength could be determined at a spectral resolution limited by the spacing of the rulings. This spacing is referred to as the grating space (d). The narrower this spacing is, the more widely the spectrum is spread.

High quality diffraction gratings are fabricated by ruling fine grooves with a diamond point either on a plane glass surface to produce a transmission grating, or on a polished metal mirror to produce a reflection grating. The grooves scatter light and are effectively opaque while the undisturbed parts of the surface transmit or reflect light regularly and act as slits. The most fundamental requirement for a good diffraction grating is that the lines must be as equally spaced as possible across the entire surface of the grating, which may be up to 25 cm in width. After each groove has been ruled, the diamond point must be lifted and moved to the location of the next groove, and few ruling machine exist to meet this difficult requirement. Consequently, high quality rule diffraction gratings can be quite expensive. Photolithographic techniques have been developed which allow gratings to be created from holographic interference patterns. Holographic gratings have sinusoidal grooves and are, therefore, not as efficient as ruled gratings, though they have much lower fabrication costs.

A third type of device that can be used to disperse light into its spectral components, is the Fabry-Perot interferometer or etalon. To be precise, the former term refers to a device that uses two parallel highly reflecting mirrors while the latter is a transparent plate onto which has been deposited two reflecting surfaces, though the two terms are often used synonymously. The device is named after Charles Fabry and Alfred Perot. Etalon is from the French etalon, meaning "measuring gauge" or "standard".

Generally speaking, interferometry is the science of superimposing or interfering two or more input waves to create a different output wave that can subsequently be used to obtain information about the differences between the input waves. It is based on the principle that two waves that coincide with the same phase will add to each other while two waves that have opposite phases will cancel each other out when both waves have the same amplitude. The varying transmission function of an etalon is caused by interference between the multiple reflections of light between the two reflecting surfaces. Constructive interference occurs when the transmitted waves are in phase, resulting in high transmission. Destructive interference occurs when the transmitted waves are out of phase, resulting in low transmission. Whether the multiply-reflected waves are in phase depends on the wavelength of the light (λ), the angle the light travels through the etalon (θ), the thickness of the etalon (l), and the refractive index of the material between the reflecting surfaces (n).

The relationship between the wavelength of the light and the angle that it travels inside the etalon, for each maxima (m), is given by:

$$2nl \cos \theta = m\lambda$$

SUMMARY OF THE INVENTION

A miniature wedged etalon is mounted atop a linear sensor, signals from the individual photosets of the sensor are used to determine the relative amounts of energy at each wavelength. The relationship of the distance between photosets on the sensor and the overall length and spectral range of the wedged etalon will determine the spectral resolution (wavelength interval) that such a spectral sensor can deliver. For a range of 400 nm to 700 nm and a 128-pixel sensor, this resolution is approximately 3 nm.

A spectral sensor such as this, along with a sufficient white light source and properly configured optical path, can be used to construct a low-cost, high-speed, compact spectrophotometer. The high speed is attributed to the single white light exposure from the light source and from capturing all of the spectral data with a single acquisition. The compact size is attributed to the correspondingly small size of the spectral sensor and optical path requirements. The low cost is achieved by using inexpensive materials, including the miniature wedged etalon which can be manufactured in quantities at low cost.

The primary requirement of the light source is that is must be capable of emitting nearly equal energy output at all wavelengths in the visible portion of the spectrum. Other characteristics that must be taken into consideration include power consumption, the generation of heat, the safety concern regarding ultraviolet radiation, consistence of output, and lifetime.

While tungsten-halogen sources are commonly used in commercial spectrophotometers, they tend to lack energy in the blue portion of the visible spectrum below about 450 nm. They also tend to produce a considerable amount of infrared energy requiring the use of IR absorbing or blocking optics to avoid saturating the sensor. The light vs. heat efficiency of tungsten halogen sources is only about 20% and the resulting heat usually must be handled with cooling and ventilation systems.

An alternative to tungsten-halogen sources is the Xenon arc lamp. These sources produce broad energy output in the range of about 200 nm to 2000 nm, which includes ultraviolet and infrared. These sources require high voltage and are difficult to miniaturize. The spectral output or spectral power distribution of Xenon sources is not entirely smooth as it is for tungsten sources and other blackbody radiators, but tends to exhibit many spikes throughout the visible spectrum and these isolated spikes of energy can be present difficulties.

Another light source that is gaining popularity in color measurement devices is the light emitting diode or LED. An LED is a semiconductor device that emits a band of light when an electric current is applied to it, an effect is known as electroluminescence. The color of the emitted light is dependent upon the composition of the semiconducting material used and can fall throughout the visible portion of the spectrum as well as the infrared and near-ultraviolet. The spectra of LEDs range from quite narrow to fairly broad. White light LEDs have been produced by combining two or more semiconductor materials in a single LED. Most of these consist of materials that emit blue light and yellow light. While the light emitted by these LEDs is, for the most part, white light, it usually has a distinct bias that is either very cool (bluish) or very warm (reddish yellow). Some advantages of LEDs are their efficiency, low power consumption, the ability to exclude undesirable wavelengths such as infrared, and their long stable lives.

A large variety of LEDs are available with different spectral power distributions covering most of the visible spectrum, but there are a few regions of the spectrum that are lacking coverage by LEDs. The regions that are most lacking coverage by LEDs are the bands centered at about 420 nm, 485 nm, 580 nm and 680 nm. If individual LEDs covering the entire visible region of the spectrum were all turned on at once and if the resulting light were mixed or integrated, then the mixture would consist of white light that could be used to illuminate reflective samples for the purpose of color measurement.

One alternative to mixing the light from all of the LEDs is to light up each one individually and to take one reading corresponding to each of the individual LEDs. This approach is impractical for a device with several LEDs as the measurement time becomes prohibitively long.

BRIEF DESCRIPTION OF THE DRAWINGS

The present invention may best be described by reference to the accompanying drawings in which:

FIG. 3 is a simplified exploded view of a portion of a spectrophotometer constructed in accordance with the teachings of the present invention.

FIG. 4 is a cross-section of a portion of the spectrophotometer of FIG. 3 useful for describing the spatial relationship of various parts.

DETAILED DESCRIPTION OF THE INVENTION

In order to build a color measurement device that uses LEDs as a light source and activates all of the LEDs at one time, the choice of LEDs should be made such that the resulting mixture of light has nearly equal energy at all wavelengths in the visible spectrum. In order to achieve this, the spectral gaps mentioned earlier need to be filled. Otherwise, with pockets of missing energy, the spectrum of the mixture would be fairly bumpy, potentially compromising the accuracy of the device. Despite the unavailability of LEDs covering these spectral ranges, fluorescing materials are available that can be combined with LEDs to provide the additional energy.

Figure 1:
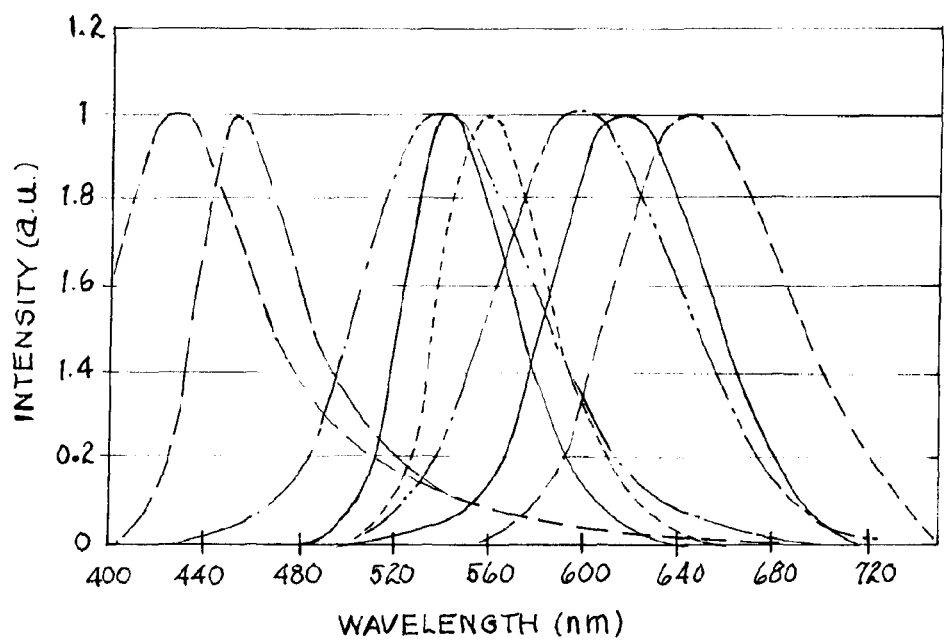
FIG. 1 is a chart showing the emission spectra of selected fluorescing materials.

Fluorescence is a form of luminescence, or cold body radiation. Fluorescence occurs when a material's molecular absorption of a photon triggers the emission of another photon with a (usually) longer wavelength. Usually the wavelengths of the absorbed photons lie in the ultraviolet-to-blue range, and the wavelengths of the emitted photons can fall at just about any longer wavelength in the visible spectrum, depending upon the molecular properties of the fluorescent material. The materials, in powder form, can be mixed with optically clear epoxy resin that can be used to replace the LED lens, or coated onto a transparent surface that can be placed in the optical path of the light emitted from the LED. If the uncoated LED emits radiation with the appropriate wavelength, when coated, the resulting spectral power distribution will consist of a reduced amount of radiation with the original wavelength, and visible light with the longer wavelengths associated with the fluorescing material. Emission spectra of several commercially available fluorescing materials is shown in FIG. 1.

The use of LEDs and fluorescing materials as the light source in a color measurement device such as a spectrophotometer affords several advantages over other types of light sources. First, a source comprising LEDs has a very high efficiency in terms of the amount of light output versus the amount of power consumed. For example, a spectrophotometer using LEDs and fluorescing materials can be made that consumes less than 180 mA at about 3.5V which allows for the instrument to be powered from the USB port of a common laptop computer. Another advantage afforded by this type of source is that it's lifetime is long and there should never be a need for it to be replaced. Another advantage is that the source can be configured such that no unwanted infrared radiation is present nor is any significant heat generated, so there is no need for costly subsystems to compensate for unwanted energy.

A spectrophotometer using a variety of LEDs as a light source can offer a new feature that cannot be achieved with conventional light sources. When at least one of the LEDs in the source is of the type that emits ultraviolet radiation, the spectrophotometer can be used to test for the condition of fluorescence in other materials, such as printing media and colorants. Media used in imaging processes that include inkjet, electrophotographic, dye sublimation, and conventional silver halide printing all may include special whitening agents known as Fluorescent Whitening Agents (FWAs) or Optical Brightening Agents (OBAs). Such agents are used to increase the lightness (L*) of the media by adding to the mixture of normally reflected light some light that is the result of fluorescence of ultraviolet radiation. This can be very useful in imaging, but it can also confound color measurements by adding spikes to the media's spectral reflectance. Spectrophotometers using light sources that are deficient in ultraviolet-to-blue spectral content are unable to detect these spikes.

In addition to FWAs and OBAs, some imaging colorants including inks used in inkjet printing, dyes used in photography and dye sublimation printing, and toners used in electrophotography may exhibit fluorescence. This, in turn, can lead to unwanted color shifts and, possibly, the undesirable phenomenon of illuminant metamerism. Ultraviolet LEDs make it possible to test samples with and without UV so that presence of fluorescence can be tested.

In addition to the use of LEDs as a light source, the energization of the individual LEDs is controlled by the use of pulse width modulation (PWM) to control LED brightness. The system of the present invention uses LEDs not as the primary illumination source, but instead provides the light energy required to drive multiple layers of fluorescent phosphors that are deposited on an LED lens or on the inside of LED chambers cut into a diffuser collar, or otherwise in the illumination path from the LED; this is referred to as "electrofluorescent" illumination. The LEDs themselves are primarily blue, violet and ultraviolet; over 100 mW of UV energy is produced by the LEDs to excite the phosphor layers. In the embodiment chosen for illustration, each of eight LEDs is driven via its own PWM circuit, which can drive each LED up to 50 mA. By adjusting the PWM pulse frequency, we can increase or decrease the brightness of any combination of LEDs, each independently. Eight amplifying transistors, one per LED, are used to drive the LEDs and reduce low frequency flicker.

This configuration allows the presetting of multiple brightness levels in firmware, and calibrate each during a single white point calibration cycle. For darker samples, select higher brightness levels; for brighter samples, select lower brightness levels (based on the total reflected light energy measured with a strategically placed photodiode). The brightness level closest to optimum is chosen, and the sampling interval is adjusted accordingly.

Fluorescent phosphor coatings have been used to alter the light energy output of UV and blue LEDs. Manufacturers produce a "white" LED by applying a yellow fluorescent phosphor to blue LED; the yellow phosphor fluoresces between 480 and 720 nm, and when combined with the blue light from the LED, with a peak wavelength of 460 nm, the result is a bluish white light.

Figure 2:
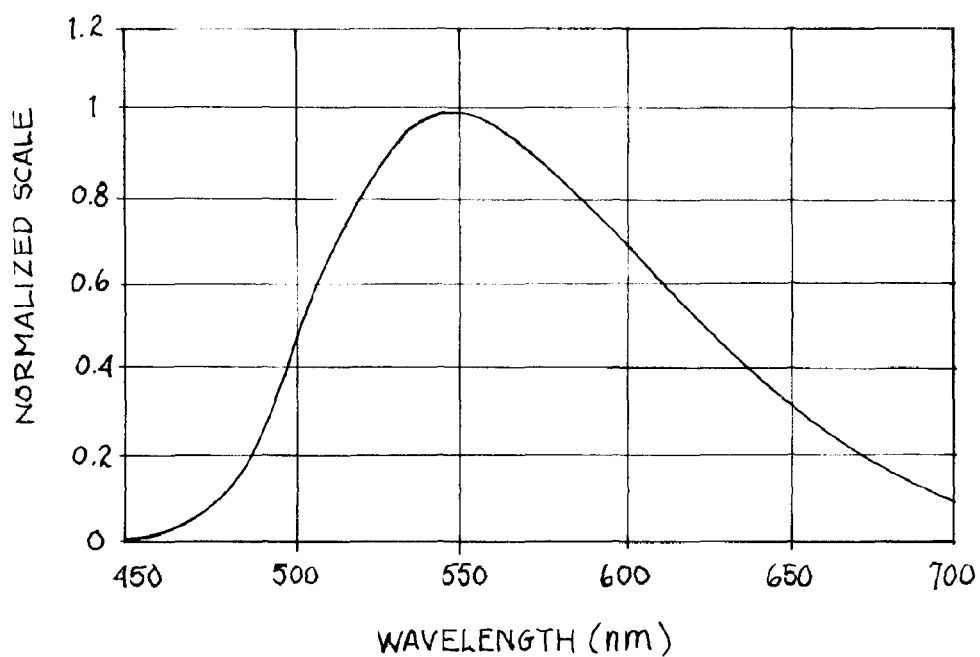
FIG. 2 is a chart of the emission spectra of a standard phosphor.

FIGS. 1 and 2 show the emission spectra of various commercially available phosphors; FIG. 1 is a chart showing various discrete phosphors, whereas the chart of FIG. 2 shows a standard "yellow" phosphor that is typically applied to a 460 nm blue LED to produce "white" light. What these emission spectra charts show is that shorter wavelength UV and blue energy is absorbed by the phosphor molecules, and longer wavelength light energy is emitted. By tweaking the phosphor chemistry, the dominant reemission wavelength can be altered. But, in all cases, shorter wavelength energy is absorbed, and longer wavelength energy is emitted. The series phosphors (shown above in FIGS. 1 and 2) work well with both UV and blue LEDs from about 400 to 470 nm; some of the longer wavelength phosphors, such as the orange and red have been found to work better with blue LEDs in the 460 to 470 nm range (which are cheaper than UV LEDs).

The commercially available UV series phosphors work only with UV LEDs' while some phosphors are optimized for UV-C energy in the 360 to 390 nm range, and do not perform well past about 395 nm. Also, by changing the density of the phosphor coating, the amount of original LED light that "punches through" the phosphor layer can be controlled. In the case of a white LED, a higher-density phosphor layer will absorb more of the original blue light, producing a warmer yellowish white light similar to an incandescent bulb. By the same token, a thinner phosphor layer will allow more blue light to pass, and will produce a bluish white light similar to a blue-filtered xenon gas filled tungsten-halogen automotive headlamp.

We have found that combining conventional high-efficiency UV and blue LEDs with specific fluorescent phosphors, will allow us to achieve a very close approximation of the standard CIE D65 daylight illuminant, with more than adequate blue/purple/violet energy to compensate for the decreased responsivity of our photodiode array in this important region. Moreover, unlike a pulsed xenon strobe or a xenon gas filled tungsten-halogen lamp, our electrofluorescent illuminant produces no extraneous UV energy and virtually no infrared. As such, we achieve high efficiency with very low power requirements.

Referring to FIG. 3, a simplified exploded view of a spectrophotometer constructed in accordance with the teachings of the present invention is shown. A printed circuit board 10 supports components required for the signal handling of the signals produced by the detection and measurement of light energy. A plurality of LEDs 11 are secured to the PCB and extend therefrom into cavities 12 provided in a diffuser collar 15. Light energy emanating from the LEDs, positioned in the cavities 12 in the diffuser collar 15 is directed downwardly through an aperture cone 18 onto a specimen whose reflecting characteristics are to be measured. A lens holder 20 supports a lens 21 and a base diffuser 23. The reflected light passes through the opening 25 in the diffuser collar and through the lens 21 and base diffuser 23 to be detected and to generate signals in a manner to be described.

FIG. 4 is a cross-section of the assembled components shown in FIG. 3 useful in describing the interrelationship of the various parts. The LEDs 11 direct light as shown by the arrow 30 out of the aperture 31 provided in the aperture cone 18. The diffuser collar 15 in addition to providing cavities 12 for the respective LEDs diffuses the light emanating from the respective LEDs. Reflected light is directed as shown by arrow 32 through optics chamber 34 lens 21 and base diffuser 23. This light is directed through trim filters onto photodetectors in a manner to be described. The LEDs 11 are arranged in a circular array and are individually energized by adjustable power application techniques incorporating pulse width modulation to be described. Each of the LEDs is provided with a phosphor unique to each of the individual LEDs which may be coated on the LED lens, used as a coating within cavities 12, or otherwise positioned to intercept the radiation from the respective LEDs and generate the usually longer wavelength as determined by the specific phosphor used with the individual LEDs.

Another important advantage of electrofluorescent illumination is the ability to control UV energy output, allowing the testing for fluorescence in inks and media coatings. Inks, especially pigment-based inks, can contain compounds that produce unintended fluorescence; these compounds can absorb naturally-occurring UV energy (for example, daylight) and reemit longer wavelength energy elsewhere in the visible spectrum. This phenomenon can result in serious problems with metamerism and color constancy. Virtually all spectrophotometers used in the commercial printing industry today employ a single illumination source that either generates UV energy or does not; however, by adding at lease one "phosphor-free" 395 nm high-energy (30 mW) UV LED to the light array the amount of UV energy produced during the measurement cycle can be adjusted thus, creating a variable digital UV filter that can be used to measure the impact of fluorescence in an ink, or in a media whitener or surface coating. The spectral reflectance of a single sample can be measured multiple times, each time varying the level of UV-C energy (350 to 400 nm) from zero, to any percentage up to 100; the results for the user can then be plotted to analyze, or incorporate the data into a color profile where it can be used to compensate for real-world illumination and viewing conditions.

Digital Pulse Width Modulation (PWM) is a method of modulating the duty cycle of a power source, to control the amount of power provided to a load, such as a light emitting diode (LED), light emitting polymer or similar such compound, or other similar type solid-state light emitting device with instant-on or near instant-on capability. By controlling the power provided to the LED or similar such device, the apparent brightness, or output intensity of the device (total photonic energy emitted) may be controlled with a reasonable degree of precision. As such, the average power delivered to the light-emitting device is directly proportional to the modulated duty cycle of the PWM output.

To prevent the LED or similar such device from visibly flickering, the frequency of the pulses should be set to a moderately high value, sufficient to achieve flicker-free, or nearly flicker-free operation. The selected frequency defines the number of pulses per time interval (ex. per second) that the PWM circuit will produce. The duty cycle is then defined as the width of each pulse relative to the number of pulses per time interval. For example, a frequency of ten thousand pulses per second (10 KHz) allows for a maximum pulse width of 100 microseconds ($\mu$s). Therefore, a 10 $\mu$s pulse at a 10 KHz pulse frequency represents a duty cycle of 10%, whereas a 50 $\mu$s pulse with the same pulse frequency would represent a duty cycle of 50%.

For a microprocessor-controlled digital PWM, the pulse width period value represents the reference value for the PWM comparator. A high-resolution timer/counter is used to control pulse generation. When the counter value exceeds the comparator reference value, the PWM output switches state; at the end of the pulse cycle the counter is reset. The resolution of the timer/counter, coupled with the desired pulse frequency and the clock speed of the microprocessor, defines the precision with which the pulse width may be varied. For example, a 16-bit timer/counter driven by a 1 MHz clock will increment from 0 to 65535 in approximately 66 milliseconds (ms); each count therefore equates to an approximate 1 $\mu$s interval.

For the pulse frequency defined above, this would allow the width of each pulse to be defined from 0 to 100% duty cycle in increments equivalent to very nearly 1%. With a 10 MHz clock, the pulse frequency could be increased to 100 KHz with the same pulse width control precision, or kept at 10 KHz with a pulse width increment resolution of 0.1%. In the former case, the pulse cycle is 100 $\mu$s, and the pulse width is a value between 0 and 100; whereas in the latter case, the pulse cycle is 10 $\mu$s, and the range is 0 to 10.

The PWM output changes state from high (on) to low (off) when the counter value increments beyond the reference value; however, the circuit could similarly be designed to switch from low (off) to high (on) when the reference value is exceeded, without changing the fundamental functionality of the circuit. Likewise, several PWM methods may be employed, with similar results: the center point of the pulse may be fixed, and both edges of the pulse moved to expand or compress with the width of the pulse; the leading edge of the pulse may be fixed, and the trailing edge moved to vary the pulse width; or, the trailing edge of the pulse may be fixed, and the leading edge moved to vary the pulse width. In all cases, the same modulated duty cycle is achieved.

Figure 5:
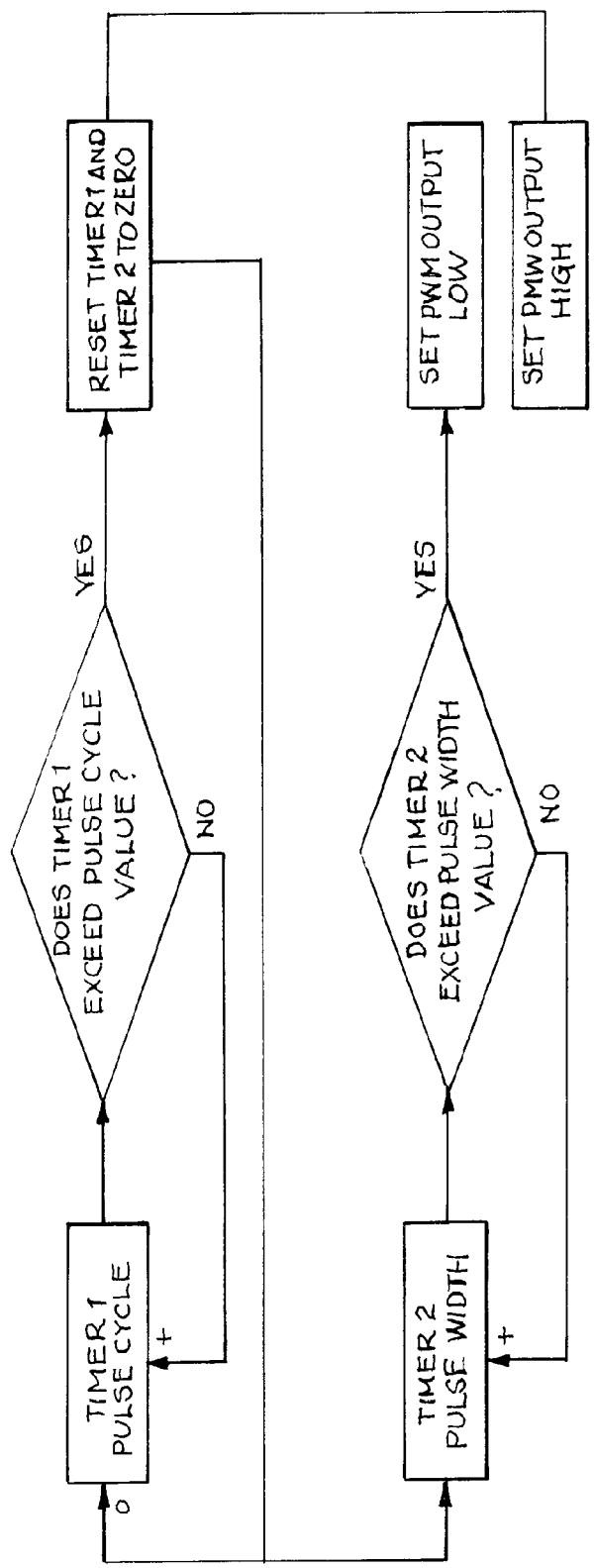
FIG. 5 is a logic flow diagram useful for describing the operation of pulse width modulation in the system of the present invention.

FIG. 5 shows two timer/counters employed to control PWM pulse generation. The first, Timer 1, controls the pulse cycle, which in turn defines the number of pulses per time interval, or pulse frequency. When this timer/counter increments past the pulse cycle value, both Timer 1 and Timer 2 are reset, and the PWM output is set high (on). Timer 2 controls the pulse width; when this timer/counter increments past the pulse width (reference) value, the PWM output is set low (off) and remains low until both timer/counters are reset.

Figure 6:
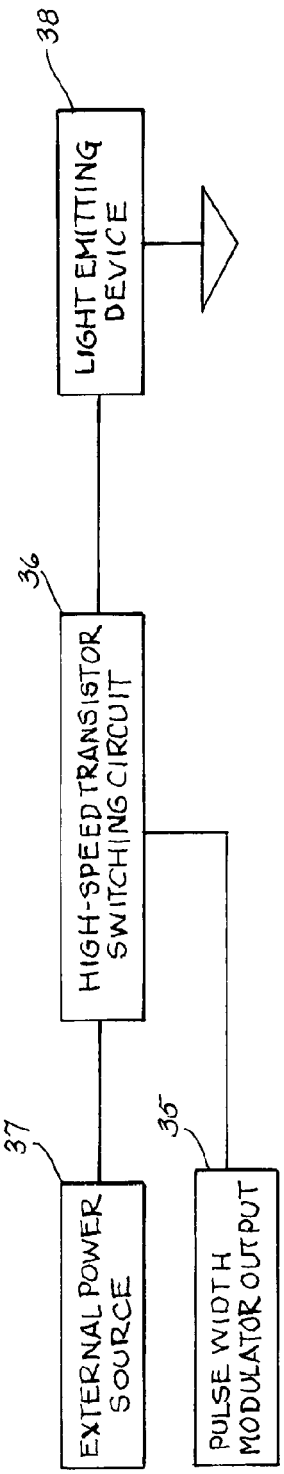
FIG. 6 is a functional block diagram useful in the description of pulse width modulation as used in the system of the present invention.

For a microprocessor-controlled digital PWM, the PWM output may be an output pin of the microprocessor, which may be of insufficient power to directly drive a light emitting device, such as an LED or similar such device. In such cases, additional circuitry may be employed, allowing the PWM output to control a device of higher power than what it might be otherwise capable of driving directly. Referring to FIG. 6, a functional block diagram is shown useful for describing the operation of pulse width modulation incorporated in the present invention. The PWM output 35 is applied through a high speed transistor switching circuit 36 to the corresponding light emitting device 38. An external power source 37 supplied sufficient power for driving the LED 38 when the pulse width modulator 35 may not have sufficient power to appropriately energize the LED.

Figure 7:
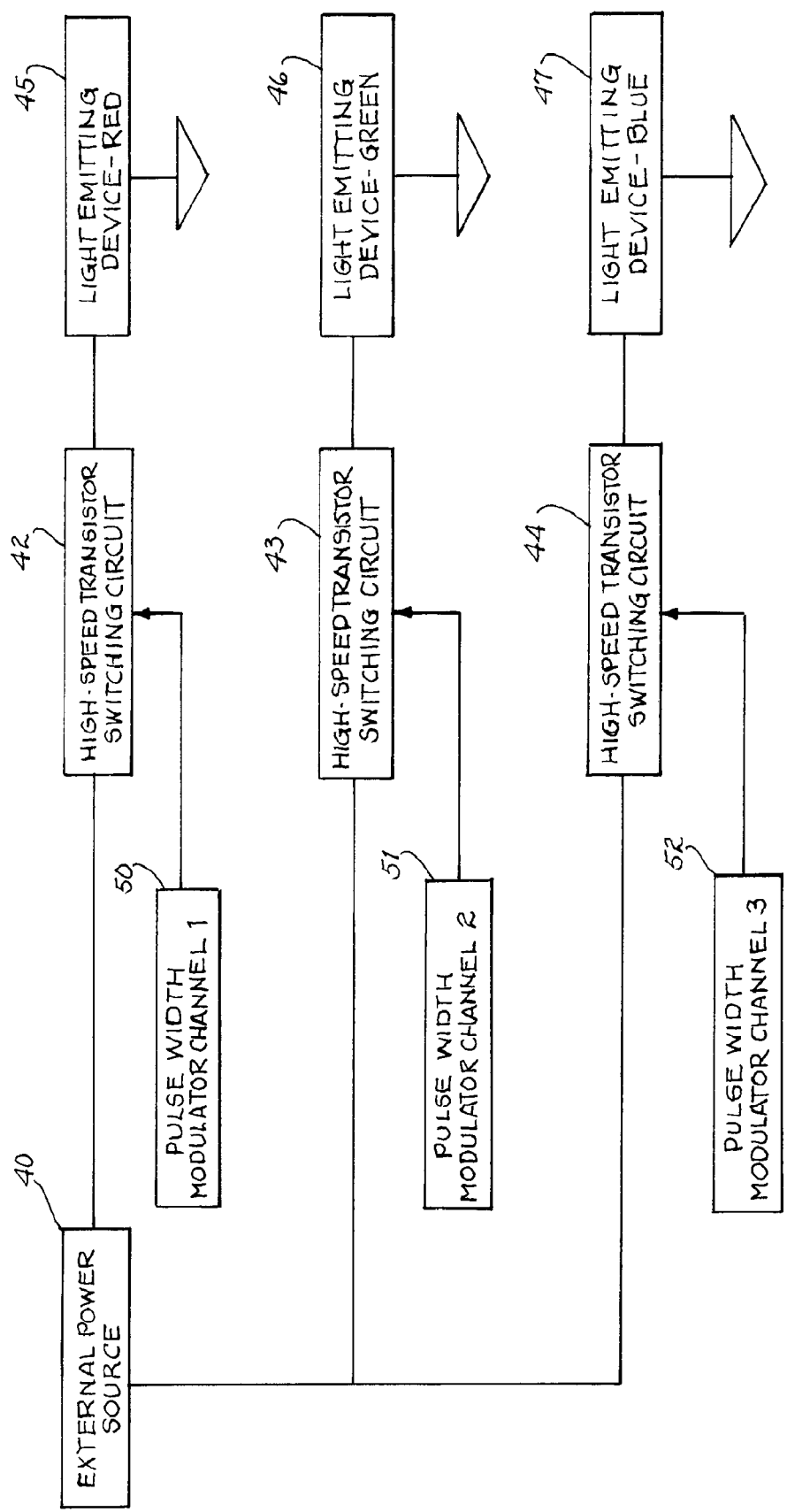
FIG. 7 is a functional block diagram illustrating the use of pulse width modulation in a multi-LED system.

When multiple light-emitting devices are employed, such as an array of LEDs described above, multiple PWM circuits, or one or more multi-channel PWMs, may be used to allow for independent control of individual devices, or clusters or groupings of devices. Similarly, in a situation where multiple narrow band light-emitting device are used to produce a broad spectrum output, such as combination of LEDs, organic LEDs or light emitting polymers of various colors, multiple PWMs, or one or more multi-channel PWMs may be employed to control the brightness, or intensity, of each color source to achieve an optimum color mixture for the combined broad spectrum output, as well as control the overall brightness of the combined output without changing the composite color. Referring to FIG. 7, a simplified functional block diagram is shown wherein an external power source 40 provides power through a plurality of high speed transistor switching circuits 42, 43, and 44 to respective light emitting devices 45, 46, and 47. The application of the power source 40 to the respective LED is controlled through a corresponding modulator channel of pulse width channels 50, 51, and 52, respectively. Pulse width modulation techniques are well known and circuits for implementing the modulation and utilization of the resulting signal are common circuit design techniques. The particular modulating technique forms no part of the present invention; however, the implementation of PWM to energize selected LEDs and control the power applied to the respective LEDs is a novel application of pulse modulation to spectrophotometry.

Because most light-emitting devices are affected by temperature, in that the brightness, or intensity of the light output of the device is typically inversely proportional to the ambient temperature, a temperature sensor is employed together with the PWM circuit to compensate for temperature change over the normal operating range of the device. The temperature sensor may be positioned in any convenient location to sense the corresponding ambient temperature. For example, if each incremental increase in pulse width was calibrated to produce a 1% increase in brightness, and if each 1° C. increase in temperature produced a 0.5% decrease in device brightness, then a 6° C. increase in temperature, resulting in a 3% decrease in brightness, could be offset by a three-increment increase in the width of the PWM pulse output. The use of the PWM circuit would provide a more stable level of brightness over a wider range of operating temperatures.

Figure 8:
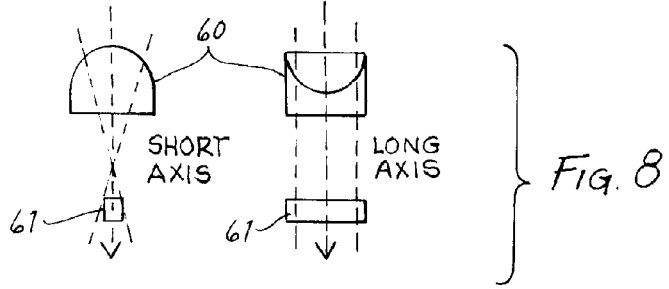
FIG. 8 is an illustration of a light path geometry converter in the form of a round cylindrical lens.

Referring again to FIGS. 3 and 4, light entering the optics chamber 34 passes through a light path geometry converter, or light concentrator, designed to direct and concentrate light entering the circular input aperture 31 of the spectrometer, to a narrow line consistent with the surface area of a spectral sensor. Two techniques that can be employed to shape the light beam: the first utilizes a round cylindrical lens with a diameter approximate to the length of the spectral sensor such as shown in FIG. 8. The cylinder lens 60 will focus (bend) light on only one axis, so that light incident on the lens will form a line of a length approximate to the diameter of the lens, and a width that can be made equal to the width of a spectral sensor 61 by positioning the sensor just beyond the focal point of the lens.

Figure 9:
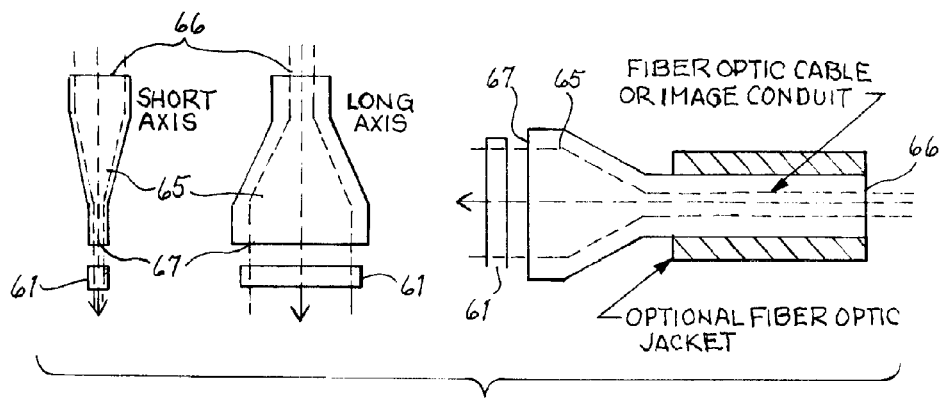
FIG. 9 is an illustration of a light path geometry converter in the form of a fiber optic light transmission device.

Referring to FIG. 9, A second technique is to employ a fiber optic geometry converter 65, made from plastic or similar flexible (jacketed or unjacketed) fiber optic strands fitted into a fixture and secured into place with epoxy or other means; or, optical grade glass fibers fused to form a shape in which one end 66, the input end, is roughly equal in length and width (forming a generally round, square, hexagonal or similar such geometry) while the output end 67 is of a length and width approximate to that of a spectral sensor 61. Both input and output ends should have roughly equal area, so that an output end that is approximately 2.1×9.5 mm, or 20 sq. mm in area, will have an input end of roughly equal area, which might be a square of approximately 4.5 mm per side, or a circle with an approximate diameter of 5 mm. The fibers themselves should have a numeric aperture (NA) of moderate value to allow for ample light transmission, and light containment within the fiber core to prevent significant light loss at bend points. Extra mural absorption (EMA) materials, such as dark glass, can be added to a converter made of fused optical grade glass, in relatively small ratios, to improve contrast, although the addition or elimination of EMA materials, differences in NA value, or choice of raw fiber material (provided it does not differ significantly from the basic design as described) will not significantly change the fundamental function of the converter conduit for this application.

The choice between the cylindrical lens and the fiber optic converter conduit is a choice between light gathering ability and aperture size; both act as optical geometry converters. The cylindrical lens configuration, however, allows for maximum light gathering, as the lens diameter (and therefore the input aperture) must be roughly equal to the length of the spectral sensor. In this case, the lens acts very much as a light concentrator, directing light that would otherwise fall outside the active area of the spectral sensor onto the sensor face; concentrating light gathered from an area several time greater than the actual active sensor area. With the fiber optic conduit approach, the input aperture diameter is smaller, as both the input and output of the fiber optic converter conduit are roughly equal. This approach reduces the total light gathering capability of the optics, but allows for a smaller sampling area and makes easier a direct interface to fiber optic cables and image conduits.

With regard to interfacing to fiber optic cables and optical image conduits (the former typically being made of flexible plastic fibers and used primarily for the transmission of visible light, and the latter typically being made of optical grade glass fibers suitable for both visible and near infrared transmission), the input end of the fiber optic geometry converter can be extended some distance (depending on materials used) so that the spectrometer module need not be in close proximity to the sampling area. This can be useful when sampling in harsh environments, or when space near the sample area is constrained to the point that the spectrometer itself cannot fit the available dimensions.

If plastic fibers are used for the geometry converter, the fibers themselves can be extended out beyond the spectrometer aperture opening, where they can be bundled and jacketed to form a flexible cable that can be several centimeters to several meters in length. If glass fibers are used, the fiber bundle can extend beyond the spectrometer aperture as a glass conduit for some distance, where it could be connected with a flexible fiber optic cable or positioned over the sample area. In such case, the glass conduit would form an optical "snout" suitable for interfacing to additional optical components external to the spectrometer module.

Figure 10:
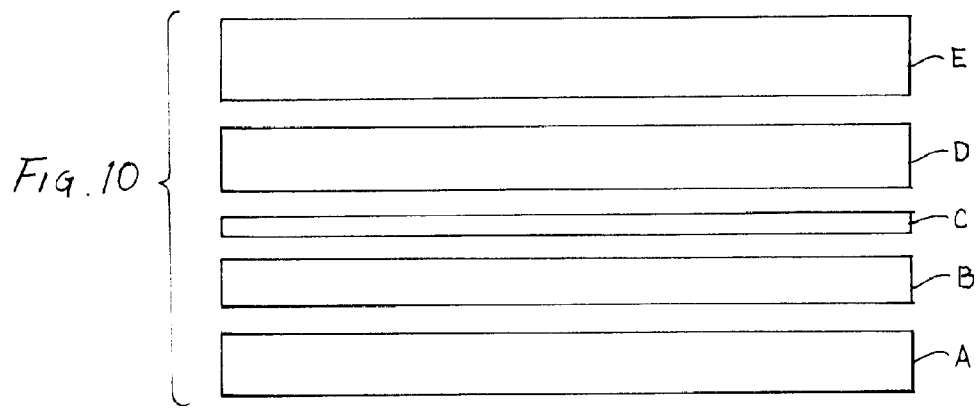
FIG. 10 is a schematic illustration of a spectral sensor assembly incorporated in the present invention.

The spectral sensor incorporated in the present invention acts as a "digital prism" converting polychromatic, or "white" light into its constituent spectra, which may include visible spectrum (VIS) white light of between 350 and 750 nm wavelength, near infrared (NIR) light of between 750 and 1500 nm, far infrared (IR) above 1500 nm wavelength and ultraviolet (UV) light below 350 nm wavelength. The spectral sensor assembly incorporates three main subcomponents: 1. an array of light sensitive photo detector sites, which may include photodiodes, phototransistors, or other similar such light detecting circuitry consistent with the wavelength regions of interest, and consisting of multiple photo sites arranged in a linear array or in a roughly rectangular grouping in which rows of photo sites compose the long axis, and columns the short axis; 2. a wedged etalon or an interference filter wedge, formed of multiple bandpass filter coating layers applied in such a way so that composite interference coating layer thickness varies edge-to-edge to form a wedge-like shape at submicron scale along the long axis of the photo detector array, and wherein the center wavelength (CWL) of each pass band is a function of the coating thickness, so that the peak wavelength transmitted through the filter at any given point will vary in an roughly linear fashion in the direction of the filter coating wedge (which is the direction of the long axis of the sensor); and, 3. a collimating faceplate comprising an array of optically transparent plastic or glass fiber optic elements on the scale of 5 to 100 microns diameter, with similar center-to-center spacing and of a low numeric aperture combined with some ratio of extra mural absorption (EMA) material, or similarly a monolithic plate of light absorbing material, such as an EMA-type material, in which an array of holes, or capillaries, on the scale of 5 to 100 microns diameter and with similar center-to-center spacing, has been etched, drilled or otherwise cut to the light absorbing plate, and in which the purpose of the faceplate, of either fiber optic or capillary array design, is to collimate the light incident on the interference filter coating, so as to reject light with incidence angles greater than 20° relative to the plane of the coating, and to form a series of overlapping emergence cones with half-angles of 20° or less, and with overlapping areas sufficient to provide a generally uniform level of illumination to the entire area of the coating layer that overlays the array of photo detectors. Referring to FIG. 10, a schematic illustration of a spectral sensor assembly incorporated in the present invention is shown. The assembly illustrates layers A through E wherein the respective layers may be described as follows:

A. Photo detector array, including photo detector sites and auxiliary supporting circuitry.

B. Glass substrate used to support interference filter wedge coating for purposes of manufacturing photo detector array. This part is optional; the coating could be applied directly to the array but current manufacturing methods do not allow for this. This layer may be up to 1000 microns thick, and is optimally 500 microns thick.

C. The interference filter wedge coating, or variable bandpass coating. The coating, which is very thin and not self-supporting, must be applied to a supporting glass substrate, typically a high-quality optical grade glass.

D. Glass separation layer, which should be of the same type and with the same, or very similar refractive index as "B" above. This glass layer may also be used to support the interference filter wedge coating, although its primary purpose is to allow for the formation of overlapping emergence cones created by the collimating faceplate. The thickness of this layer is dependent on the geometry of the collimating faceplate (numeric aperture, fiber or capillary diameter, center-to-center spacing, emergence cone half-angle, etc.).

E. Collimating faceplate, which insures that light incident upon the interference filter wedge coating is restricted to angles of incidence of 20° or less, and that the coating is roughly uniformly illuminated in all areas in which the coating layer overlays the photo detector sites. The faceplate, if formed using fiber optic elements, should be at least 500 microns for most applications, and optimally between 1000 and 2000 microns thick; fiber cores for a typical VIS or NIR application will be in the range to 40 to 45 microns diameter, with a cladding of 2 microns thickness and an EMA jacket of 4 to 5 microns per fiber, for an overall center-to-center spacing of approximately 55 microns will yield an open area ratio (OAR) of 60 to 70% with a numeric aperture (NA) of 0.2 to yield an emergence cone half-angle in air of approximately 11.5°. A similarly configured capillary array plate would be 500 microns thick, and could yield an NA value of between 0.1 and 0.15 with an OAR of approximately 45 to 50%. In either case, the fiber elements or capillary array may be arranged in a rectangular or hexagonal structure.

Figure 11:
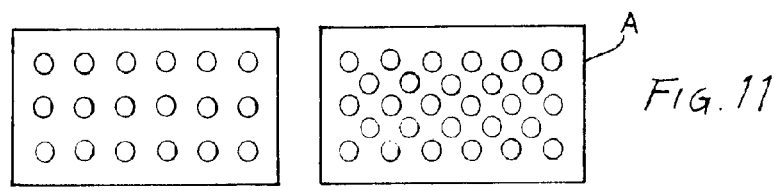
FIG. 11 is an illustration of alternative patterns of fiber optic arrays or capillary arrays in the collimating faceplate of FIG. 10.
Figure 12:
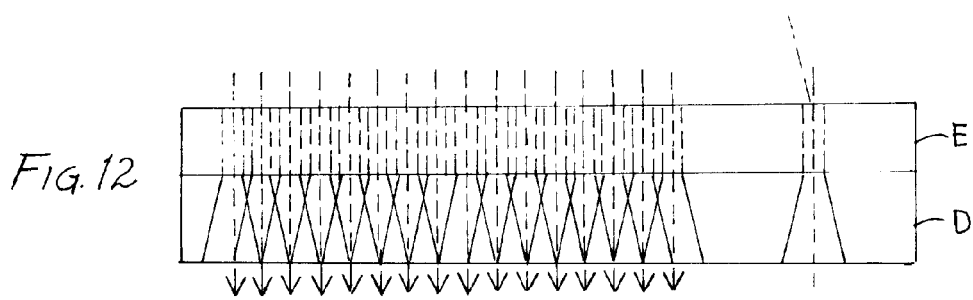
FIG. 12 is a partial cross-section of the collimating faceplate E of FIGS. 10 and 11 in contact with the glass substrate useful for describing the collimating of the faceplate used in the present invention.
Figure 13:
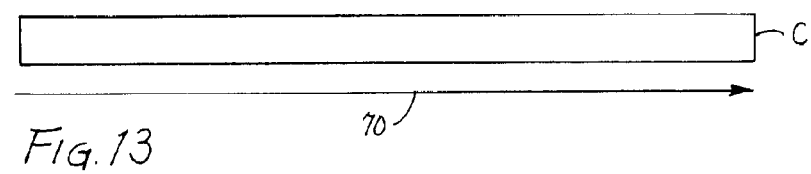
FIG. 13 is a schematic illustration of the interferences filter wedge coating.
Figure 14:
FIG. 14 is a schematic representation of a linear photo detector array.

Referring to FIG. 11, an illustration of alternative patterns of fiber optic arrays or capillary arrays on the collimating faceplate incorporated in FIG. 10 is shown. FIG. 12 represents a partial cross-section of the collimating faceplate E of FIGS. 10 and 11. The interference filter wedge coating C of FIG. 10 is illustrated in FIG. 13 indicating by the arrow 70 that the coating thickness varies edge-to-edge along the long axis. The linearly increasing thickness of the interference filter wedge coating results in an operation upon radiant energy in a manner similar to a wedged etalon. The linearly increasing thickness of the coating performs the same function as a linearly increasing thickness of a wedged etalon. The collimating faceplate is designed with an acceptance half-angle of 20° or less; light at incidence angles greater than 20° is either absorbed or rejected. The overlapping emergence cones produced by the collimating faceplate uniformly illuminate the interference filter wedge coating C, which yields a continuous and nearly linear spectrum incident upon the photo detector array A. FIG. 14 is a schematic representation of a linear photo detector array wherein a plurality of photo detector sites are distributed along a single axis throughout the entire length of the detector. Each photo detector site represents a very narrow spectral band, as narrow as one or two nanometers. The photonic energy represented by this spectral band is converted to a digital representation via one or more high-resolution analog-to-digital conversion circuits. The original photonic spectrum can then be reassembled digitally, and reported in units of photonic energy (such as units of radiant flux).

Figure 15:
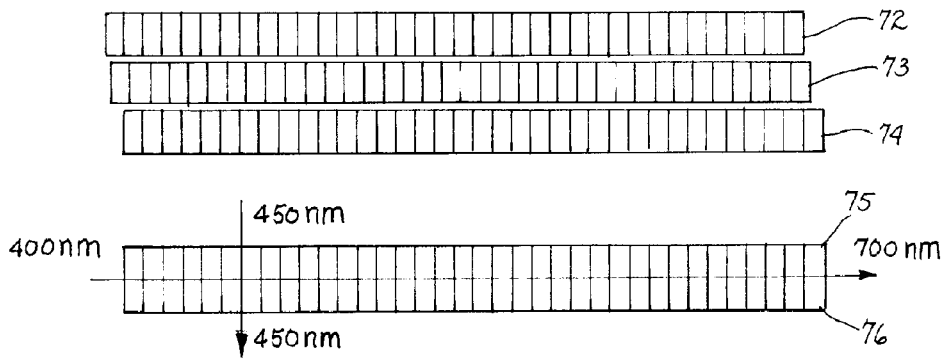
FIG. 15 is a schematic representation of alternate arrangements of photo detector sites in a photo detector array.

To further improve the resolution of the sensor, multiple rows of photo detectors may be configured, in which the photo detector sites are offset by some fraction of the width of a single photo site. For example, referring to FIG. 15 three rows of photo detector sites 72, 73 and 74 could be laid side-by-side with each row offset to the next by one-third the width of a single photo site. This configuration would yield 3× the spectral resolution and light gathering ability of a single row of identical photo detectors. Similarly, two rows of photo detector sites 75 and 76 could be laid side-by-side with each row offset to the next by one-half the width of a single photo site. That configuration would yield 2× the spectral resolution of a single row.

Multiple spectral sensor assemblies may be set side-by-side in very close proximity, and illuminated from a single source, such as using a fiber optic geometry converter conduit, allowing for extremely wide band spectral samples to be taken. For example, one sensor assembly with a spectral range of 400 to 700 nm (visible spectrum) could be paired with a NIR sensor with a spectral range of 700 to 1200 nm (infrared) and additionally a UV sensor with a spectral range of 300 to 400 nm. The small size and compactness of the spectral sensor assembly makes possible numerous configurations.

Figure 16:
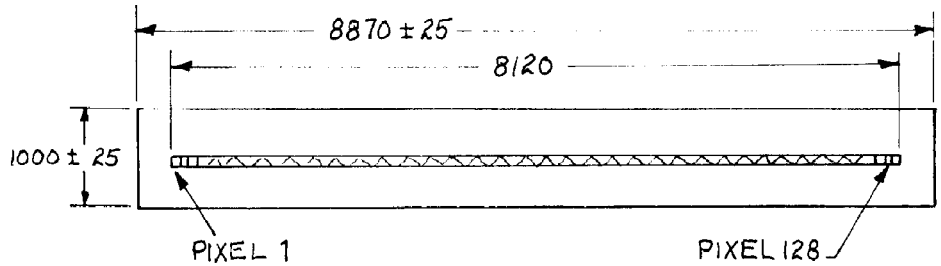
FIG. 16 is a schematic representation of a linear photo detector array showing actual dimensions for a 126 pixel array.

FIG. 16 is a top view of a 128×1 pixel linear array that has been found useful in the preferred embodiment of the present invention. All measurements are in micrometers. The width of the photodiode array is approximately 8.1 mm, while the package itself is about 8.9 mm, leaving a dead area of about 0.38 mm on each side. The package is approximately 1.0 mm tall.

The interference filter wedge coating and its supporting glass layer forming a linear variable filter (LVF) are sufficiently compact, so that the entire useable length of the LVF is visible to the photodiodes in the array. A few photodiodes on each end may see nothing; this is acceptable. The optimum range for the LVF would be approximately 380 to 720 nm, although anything from about 360 to 400 nm on the short end, and about 700 to 760 nm on the long end is acceptable. An optimum size for the LVF would be 360 to 720 nm, 1.0×8.0 mm.

The LVF would be bonded to the photodiode array using optically clear epoxy. Alignment is not critical, as each device will be software calibrated. The calibration process will identify which photodiode sites correspond to which wavelength bands. In some cases, more than one site might correspond to a single band, while other sites might straddle two bands. Sites can be selected during calibration for optimum results; site selection will vary from device-to-device, so software should be used to compensate for expected variability.

Spectral data very often consists of low signal levels with periodic "spikes" of high signal. As such, the need for very high-resolution analog-to-digital conversion (ADC) is often required, to provide adequate resolution for low signal conditions. Signal amplification, or "gain" can be incorporated into the ADC circuitry for improved low signal resolution, but at the risk of saturating high signal spikes. When saturation occurs, the peak of the spike cannot be ascertained, and the data cannot be trusted. For this reason, a spectrometer with an auto-ranging gain feature is preferred.

Auto-ranging gain refers to a gain function that provides amplification to only low signal levels, switching off (or decreasing) amplification for high signal spikes. This is accomplished by establishing two or more reference voltage (Vref) values, where one Vref is the baseline, zero gain voltage reference (also referred to as internal Vref), and the additional Vref levels are the gain levels referred to as external Vref, or gain Vref.

Analog-to-digital converters are well known and include systems and circuits having broad ranges of applicability to different technologies. The converter typically receives an analog signal having a varying amplitude and converts the instantaneous amplitude of the incoming analog signal to a digital value. The analog signal amplitude is typically sampled at a predetermined sampling rate so that the resulting output from the converter is a digital representation of the analog signal including the various attributes of the signal such as amplitude. ADCs are frequently provided as part of microprocessor circuits and access to the ADCs are available to the user through external connections to the circuit chip. Such analog-to-digital converters (ADC) are commonly found in all aspects of electronic technology including the implementation of signal conversion in spectrophotometry. The conversion of a signal amplitude into digital format is frequently complicated by the range of the analog signal amplitude. Such problems frequently result in a trade-off between system resolution and system range. ADCs typically employ a reference voltage for comparison to incoming analog signals as a means for gauging amplitude or rate of change of amplitude.

As described above, the spectral sensor includes of an array of photo detector sites; each photo site converts photonic energy into an electrical signal that is sampled by the ADC circuitry and converted to a digital value. With no gain employed, a zero digital value will represent zero electrical energy, and therefore zero photonic energy. For a 12-bit ADC, the maximum digital value will be 4095, and in such case a digital value of 4095 will represent maximum electrical energy and therefore maximum photonic energy (saturation). Increasing photonic energy beyond this point will not increase the digital value.

The ADC employs the reference voltage Vref to compare the photo detector voltage, and assign a digital value. The reference voltage (Vref+ and Vref−) establishes the dynamic range of the ADC. The resolution of the ADC remains constant, regardless of the voltage range defined by Vref+ and Vref−, so that each increment of the ADC represents a specific incremental voltage. For example, if Vref+ is set to 3.3 V and Vref is set to 0 volts, each increment of a 12-bit ADC will represent approximately 0.8 millivolts (mV). However, if Vref+ is reduced to one-quarter its normal value, or 8.25 mV, each increment of the same ADC will represent 0.2 mV, equivalent to a gain amplification of 4×.

If a low signal is presented to the ADC, in which the signal ranges from 0 to 600 Mv, the above described ADC with zero gain will resolve the signal with a maximum of 750 steps, where each step will equal 0.8 mV. This is equivalent to digitizing the signal with less than 10 bits of resolution (a 10-bit ADC would offer a maximum digital range of 0 to 1023). If a 4× gain amplification is provided, however, by reducing Vref+ from 3.3 V to 825 mV, the same signal can be resolved with 3,000 steps, where each step will equal 0.2 mV. This is equivalent to nearly 12 bits of resolution.

However, a sudden spike of 3 V would saturate the ADC, as 3 V exceeds 4× gain Vref+. Moreover, for some ADC circuitry, such an event could cause physical damage to the electrical components. Therefore, the 3 V spike must be measured using the zero gain Vref, set to 3.3 V. To do this, however, and to make the value meaningful to the user, the following method may be used;

1. Select two (or more) Vref+ values so that the ADC circuitry can switch between, one being the zero gain Vref (baseline), and the other(s) being the gain Vref.
2. Switch ADC Vref+ between the zero gain Vref and the gain Vref, and back again between each sampling of a photo detector site, so that each photo site is sampled once using the zero gain Vref, and again using the gain Vref (only if the photo site voltage is less than the gain Vref voltage).

The ADC using the zero gain Vref to determine the gain Vref voltage(s) prior to sampling each of the photo detector sites, establishes the photo detector site voltage threshold value (the value that the ADC will use to determine if the photo site can be safely sampled using the gain Vref+ voltage for reference). The firmware dictates to hold, or freeze the voltage level at each photo detector site long enough for the photo site to be sampled at least twice by the ADC circuit; once using the zero gain Vref+ to establish the voltage level, and again (if said level is below the photo site voltage threshold value) using the appropriate gain Vref. A predetermined coding scheme is defined to encode both the digital value that will represent the measured voltage level, and the selected gain value that established the voltage range, so that the encoded digital value can be decoded later and the actual level of photonic energy present can be known. The digital output thus includes a digital bit representation of the reference voltage range and the digital value of the detected voltage.

A typical firmware algorithm may thus appear as the following logic instructions:

1. Set ADC to zero gain (internal) Vref+
2. Set external Vref+ option (gain option, i.e., ½-, ¼-, ⅛-Vref, etc.)
3. Sample external Vref+ to identify actual voltage level—use average of several consecutive samples, digitized at 12 bits resolution
4. Enable temperature sensor and sample to identify ambient board temperature—use average of several consecutive samples, digitized at 12-bit resolution
5. Reset photo detector array by cycling array to clear values—repeat once, for a total of two cycles
6. Wait specified sampling integration time, defined in milliseconds, to charge photo sites
7. Begin sampling loop, n=zero to total number of photo detector sites
   Sample photo site "n" using internal Vref+
   If sample value<external Vref+ value
      Switch to external Vref+
      Wait for ADC circuit to stabilize
      Sample photo site "n" using external Vref+
      Store sample value (ex. 12-bit)+gain value identifier
      Switch to internal Vref+
      Wait for ADC to stabilize
   If sample value>=external Vref+ value
      store sample value (ex. 12-bit)+gain value identifier (zero gain)
      Repeat
8. Dump sample data to host. This string should include:
   Gain voltage and gain identifier
   Board temperature
   Photo detector site values—sample value (ex. 12-bit)+gain value identifier The present system includes the addition of a single broadband photodiode, positioned next to the spectral sensor, to measure total light energy reflected off the sample area. This device is 100+ times more sensitive than the spectral sensor, and can almost immediately indicate the total light energy striking the spectral sensor. Based on the value measured, two variables can be adjusted: source illuminant brightness, and spectral sensor integration time. This ability is a key improvement over prior art spectrophotometers that rely on a fixed illumination level and a fixed integration time. The amount of light energy reflected from a white sample target is considerably greater than that reflected from a dark blue or purple sample; as such, the total signal strength (total light energy) measured for a bright sample is much greater than that for a dark sample. Because there is always a certain amount of "noise" in any spectral measurement and because this noise is typically near constant, weak signals tend to be less reliable because the signal-to-noise ratio is low. For a spectrophotometer, this can translate into less accurate, and less stable and repeatable measurements of dark regions, especially dark blue/purple/violet regions where photodiodes tend to be less responsive. The broadband photodiode is positioned to receive light from the lens before it strikes the spectral sensor and may include a single strand fiber optic communicating the reflected light directly to the photodiode, or positioned to receive a portion of the light directed to the sensor before or after the incoming light is diffused or filtered.

Figure 17:
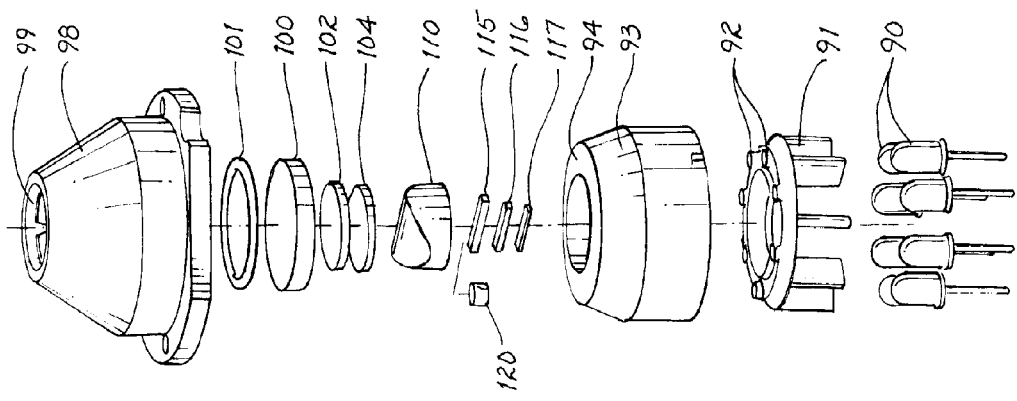
FIG. 17 is an exploded view of a schematic representation of one embodiment of a spectrophotometer constructed in accordance with the teachings of the present invention.

Referring to FIG. 17, an exploded view of the schematic representation of one embodiment of the spectrophotometer constructed in accordance with the teachings of the present invention is shown. A plurality of LEDs 90 are shown arranged in a circular array. These LEDs are positioned within an LED mounting bracket 91 having LED apertures 92 positioned in correspondence with the respective LEDs 90. As described previously, the LEDs and/or the apertures may be coated with a suitable fluorescent phosphor coating to modify the light exiting the LED apertures to correspond to desired wavelengths. The LEDS 90 are individually selected and combined with the corresponding fluorescent phosphor coating to provide a predetermined selected wavelength range that, when combined with wavelength ranges provided by the remaining LEDs and fluorescent phosphor coatings, will result in essentially a white light. The LEDs 90 are energized using pulse width modulation as described above with each LED calibrated to provide to a selected output intensity. As described above, one of the LEDs 90 may be a phosphor-free 395 nm high-energy UV LED. The utilization of this UV LED may be used to measure the impact of fluorescence on a target surface. The spectral reflectance of a single sample can be measured several times by energizing the UV LED to various levels using pulse width modulation to determine the results of different levels of UV energy striking the target to analyze the effect, if any, that the UV has in the reflectance of the surface and any color variations resulting from such fluorescence.

The light from the LEDs 90, passing through corresponding LED apertures 92, enter the diffuser collar 93 to exit the collar exit surface 94 and impinge on the interior of the aperture cone 98 as well as directly from the surface 94 through the aperture 99 and the aperture cone 98. The diffused light exiting the aperture 99 strikes the intended target resulting in reflected light passing through a protective lens 100 secured to the interior of the aperture cone by a sealing O-ring 101. The light passes the protective lens 100 and the reflected light strikes a diffuser lens 102 and then is directed to and encounters a trim filter 104 used to filter undesired wavelengths such as infrared or ultraviolet from the reflected light. The diffused and trimmed reflected light passes through a round cylindrical lens 110 as described previously and is formed into a generally rectangular format and collimated in collimator 115. The collimated light passes through a linear variable filter 116 as described previously to provide wavelength outputs that vary linearly along the length of the filter. The light passing through the linear variable filter is thus converted into its constituent spectra that impinges on a photo detector array 117 to provide signals derived therefrom corresponding to predetermined wavelength constituents of the reflected light. As described previously, a broadband photodiode 120 is positioned to detect the light being transmitted to the photo detector to provide an indication of the total light energy striking the spectral sensor.

Figure 18:
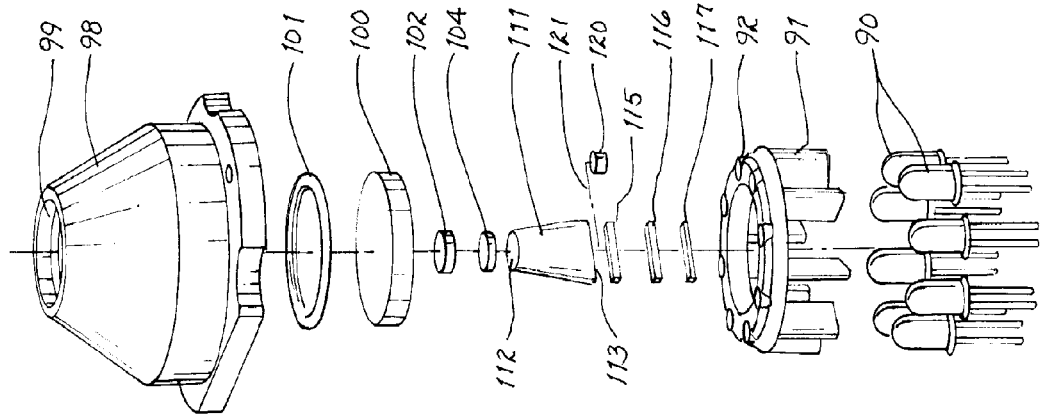
FIG. 18 is an exploded view of a schematic representation of another embodiment of a spectrophotometer constructed in accordance with the teachings of the present invention.

Referring to FIG. 18, an exploded view of schematic representation of another embodiment of a spectrophotometer constructed in accordance with the teachings of the present invention is shown. The construction of the device shown in FIG. 18 is similar to that shown in FIG. 17 and includes like reference numerals for like parts. The significant difference in the embodiment of FIG. 18 is the fact that the round cylindrical lens of the embodiment in FIG. 17 is replaced by a fiber optic geometry converter 111 as described previously herein. The fiber optic geometry converter 111 includes a circular input aperture 112 that provides a smaller input aperture than the cylindrical lens of the previous embodiment. Accordingly, the diffuser 102 and trim filter 104 are correspondingly smaller. The fiber optic geometry converter 111 "reshapes" the light path from the circular input aperture 112 to an essential rectangular output aperture 113. The output aperture 113 is conveniently shaped to correspond to the photo detector 117. The broadband photodiode 120 of the embodiment in FIG. 18 may be provided with a single strand optic fiber 121 to capture pre-photo detector light to perform the broadband photo diode function as previously described.

What is claimed:

1. In a spectrophotometer having a light source to be directed upon a reflective sample for measuring the spectral reflectance of a sample surface, an improved light source comprising:
   (a) a plurality of LEDs arranged in an array and mounted in a bracket having apertures each corresponding to a different one of said LEDs;
   (b) a corresponding plurality of electrofluorescent illuminants each corresponding to a different one of said LEDs and each positioned on a different one of said apertures to intercept emitted light energy from a corresponding different one of said LEDs and re-emit light energy at a different wavelength;
   (c) the light energy re-emitted by each electrofluorescent illuminant having a predetermined spectral bandwidth and a different center wave length and wherein the predetermined spectral bandwidths of each of electro-fluorescent illuminant, when combined with the spectral bandwidths of other electro-fluorescent illuminates produces white light; and
   (d) each of said LED being individually adjustably energized by a pulse width modulated signal.

\* \* \* \* \*